US009597251B2

(12) United States Patent
Liles et al.

(10) Patent No.: US 9,597,251 B2
(45) Date of Patent: Mar. 21, 2017

(54) SIT-TO-STAND AND WALKING ASSISTIVE MOBILITY AID

(71) Applicants: Howard J. Liles, Wethersfield, CT (US); Stephen Sprigle, Marietta, GA (US); Kenneth Curtis Paulus, Charlotte, NC (US); Thomas Randy Kirk, II, Bear Creek, NC (US)

(72) Inventors: Howard J. Liles, Wethersfield, CT (US); Stephen Sprigle, Marietta, GA (US); Kenneth Curtis Paulus, Charlotte, NC (US); Thomas Randy Kirk, II, Bear Creek, NC (US)

(73) Assignee: Edison Nation Medical, LLC, Charlotte, NC (US)

( * ) Notice: Subject to any disclaimer, the term of this patent is extended or adjusted under 35 U.S.C. 154(b) by 0 days.

(21) Appl. No.: 14/712,977

(22) Filed: May 15, 2015

(65) Prior Publication Data

US 2015/0328079 A1 Nov. 19, 2015

Related U.S. Application Data

(60) Provisional application No. 61/993,823, filed on May 15, 2014.

(51) Int. Cl.
*B62B 3/00* (2006.01)
*A61H 3/04* (2006.01)
*A61G 7/10* (2006.01)

(52) U.S. Cl.
CPC ............ *A61H 3/04* (2013.01); *A61G 7/1038* (2013.01); *A61H 2201/0192* (2013.01); *A61H 2201/1635* (2013.01)

(58) Field of Classification Search
CPC .... A61H 3/04; A61H 3/00; A61H 2201/1635; A61H 2201/0192; A61H 2201/0161; A61H 2201/1638; A61H 2003/006; A61G 7/1038
See application file for complete search history.

(56) References Cited

U.S. PATENT DOCUMENTS

| | | | | |
|---|---|---|---|---|
| 3,688,789 A * | 9/1972 | Bunch | A61H 3/00 | 135/67 |
| 4,748,994 A * | 6/1988 | Schultz | A61H 3/04 | 135/67 |
| 5,702,326 A * | 12/1997 | Renteria | A61H 3/04 | 135/67 |
| 6,837,503 B2 * | 1/2005 | Chen | A61H 3/04 | 280/47.4 |
| 6,886,575 B2 * | 5/2005 | Diamond | A45B 7/00 | 135/67 |
| 7,306,246 B2 * | 12/2007 | Gale | A61H 3/04 | 280/47.34 |

(Continued)

*Primary Examiner* — James M Dolak
(74) *Attorney, Agent, or Firm* — Blake E. Vande Garde

(57) ABSTRACT

A walker to assist a person rising from a seated position, the walker comprising: two or more front legs each having a proximal end, a center and a distal end, the distal end being adapted to contact the ground, one or more cross members secured to and joining the front legs to one another, a handle engaged to the proximal end of each front leg, a joint mechanism engaged to each the front leg, and a rear leg having a proximal end and a distal end, the proximal end being engaged to each joint mechanism allowing the rear legs to pivot relative to the front legs.

9 Claims, 16 Drawing Sheets

(56) References Cited

U.S. PATENT DOCUMENTS

| | | | | |
|---|---|---|---|---|
| 8,186,367 | B1 * | 5/2012 | Le tran | A61H 3/00 135/67 |
| 8,251,079 | B1 * | 8/2012 | Lutz | A61H 3/04 135/67 |
| 8,333,208 | B2 * | 12/2012 | Miller | A61H 3/04 135/67 |
| 8,584,689 | B2 * | 11/2013 | Catton | A61H 3/04 135/67 |
| 8,596,658 | B1 * | 12/2013 | Dashew | A61H 3/04 280/87.021 |
| 8,708,363 | B1 * | 4/2014 | Chang | A61H 3/04 135/67 |
| 8,936,262 | B2 * | 1/2015 | Nabeta | A61H 3/04 135/67 |
| 8,998,222 | B2 * | 4/2015 | Huang | A61H 3/04 280/47.34 |
| 9,393,167 | B2 * | 7/2016 | Ganel | A61G 5/1002 |
| 9,414,987 | B2 * | 8/2016 | Bagheri | A61H 3/008 |
| 9,415,635 | B2 * | 8/2016 | Liu | B60B 33/0015 |
| 9,427,374 | B2 * | 8/2016 | Hoebel | A61H 3/008 |
| 2007/0023073 | A1 * | 2/2007 | Su | A61H 3/04 135/67 |
| 2007/0267835 | A1 * | 11/2007 | Huang | A61H 3/04 280/87.05 |
| 2010/0313924 | A1 * | 12/2010 | Cho | A45B 1/02 135/66 |

* cited by examiner

Representation of reach gap between standing person and seated armrest height

SIT-TO-STAND AND WALKING ASSISTIVE MOBILITY AID

RELATED CASES

This application claims the priority of the provisional application Ser. No. 61/993,823 filed May 15, 2014. Applicant hereby incorporates by reference the entire content of provisional application Ser. No. 61/993,823.

FIELD OF THE INVENTION

A walker designed to assist an individual with rising from a seated position is disclosed herein below.

BACKGROUND OF THE INVENTION

Advances in medicine have greatly extended the life expectancy of persons all over the world. As the population ages, more and more individuals seek to maintain their independence and quality of life, even as their mobility decreases. An elderly or disabled individual may first use a cane to help maintain a mobile lifestyle. Later, that same individual may require the assistance of a walker. Persons who use walkers to assist in mobility often would benefit from assistance in rising from a seat. Current walkers do not provide assistance in both rising and walking.

Known walking assist devices provide varying proficiency in assisting a person wishing to rise from a seated position. Each displays varying degrees of deficiency relating to the instability of the device and/or the ease of use. By their designs, the support handles that are intended for assisting an individual in rising from a seated position are either unstable or positioned inconveniently to a person in a seated position behind the walker. Thus, it would be advantageous to provide a walker which is both stable and configured to adjust to the height of the user and to provide properly located handles to assist a user in both rising from and lowering to a seated position.

Hence, a need exists for an improved walker which provides assistance when a person wants to rise from a seated position, wants to descend to a seated position, and when that person wants to walk from one place to another. The walker device discussed below incorporates several significant design changes that improve the overall function and utility of the walker. The walker device disclosed herein is an improvement over those known in the art.

SUMMARY OF THE INVENTION

A walker to assist a person rising from a seated position, the walker comprising: two or more front legs each having a proximal end, a center and a distal end, the distal end being adapted to contact the ground, one or more cross members secured to and joining the front legs to one another, a handle engaged to the proximal end of each front leg, a joint mechanism engaged to each the front leg, and a rear leg having a proximal end and a distal end, the proximal end being engaged to each joint mechanism allowing the rear legs to pivot relative to the front legs.

DESCRIPTION OF THE DRAWINGS

For the purpose of illustrating the invention, there is shown in the drawings a form that is presently preferred; it being understood, however, that this invention is not limited to the precise arrangements and instrumentalities shown.

DESCRIPTION OF THE INVENTION

Figure 1:
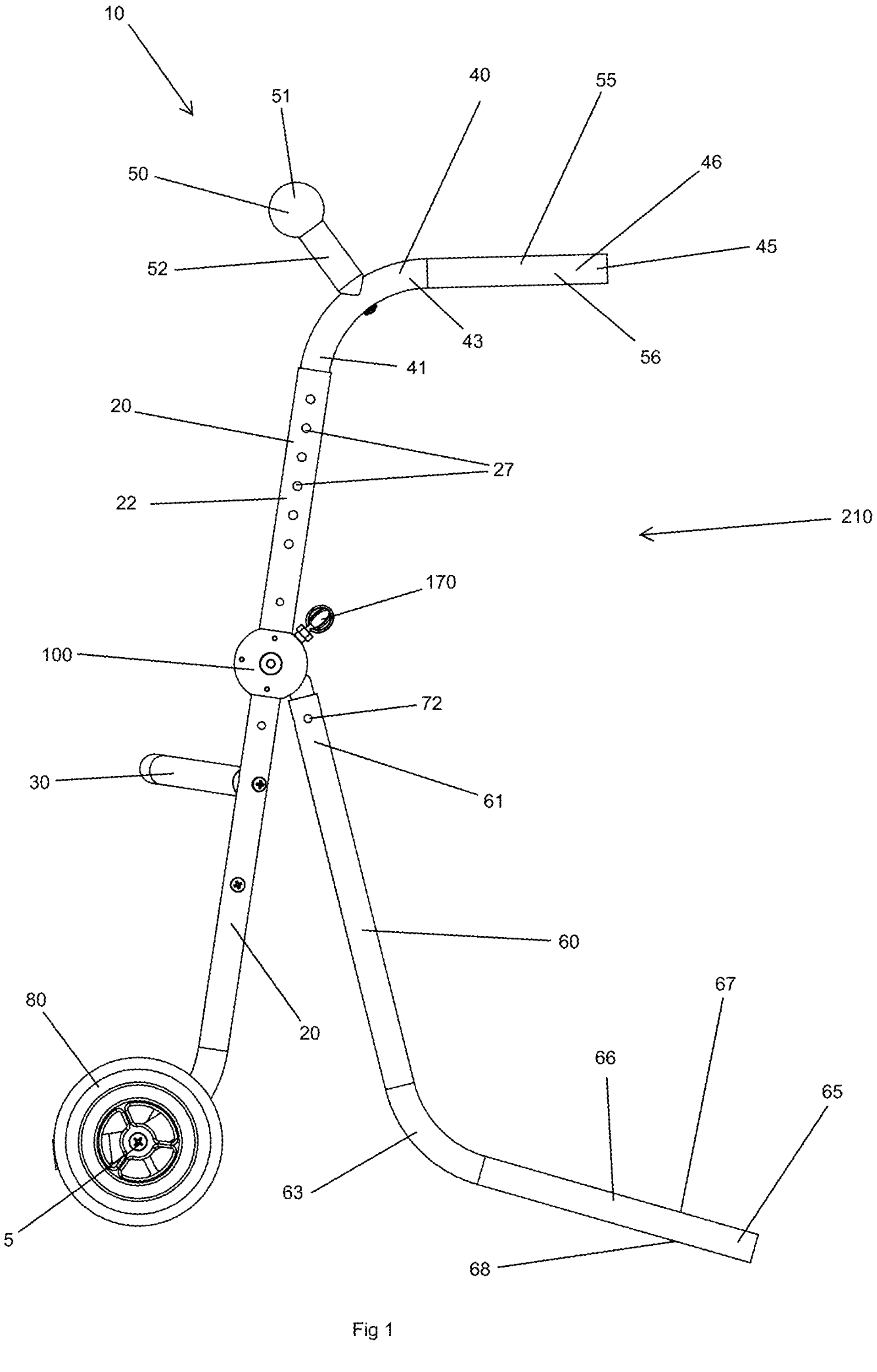
FIG. 1 is a side view of one embodiment of the present invention in a standing position.
Figure 2:
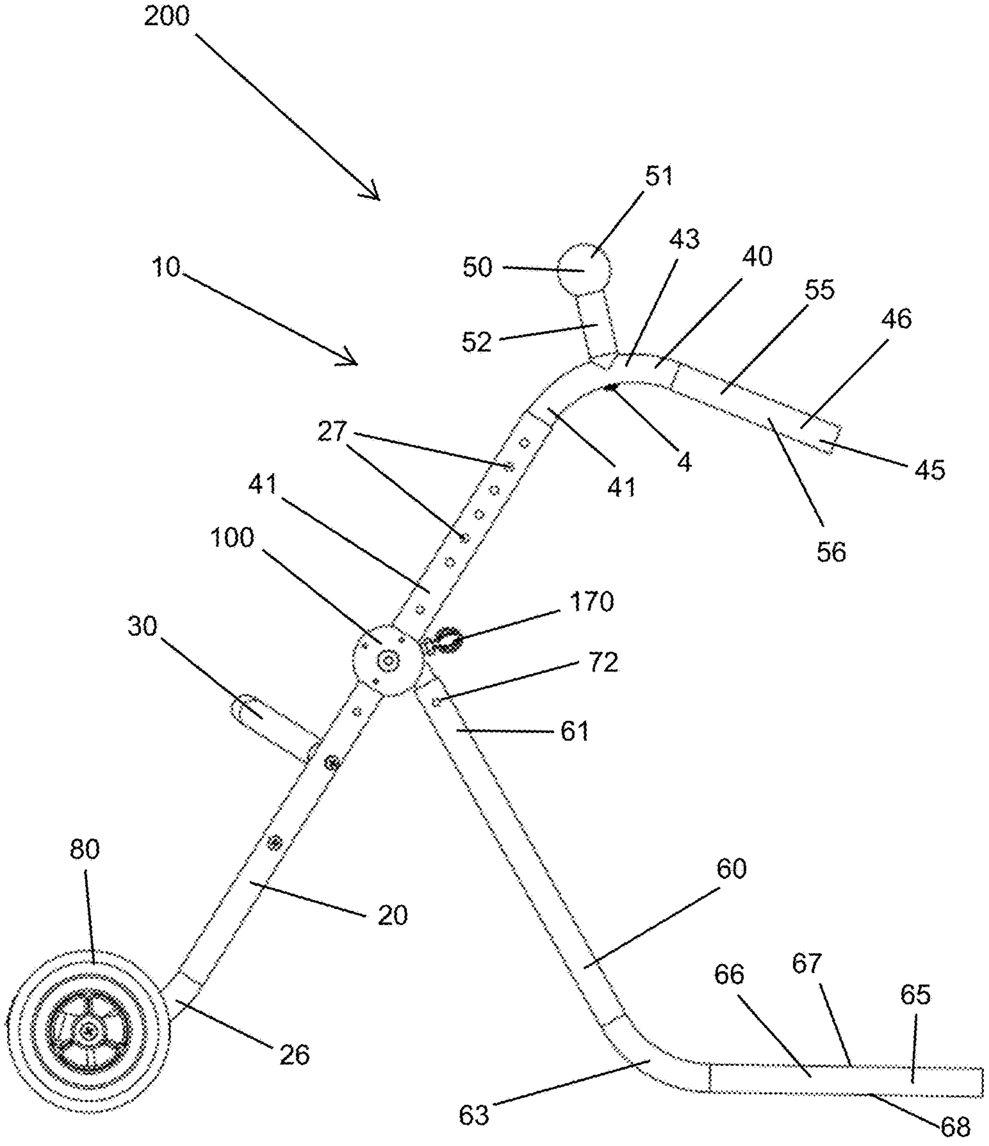
FIG. 2 is a side view of one embodiment of the present invention in a kneeling position.

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

The current invention addresses numerous issues with the prior art and includes an aesthetically pleasing, innovative walker 10 that can assist a person in rising from a seated position as well as assist in ambulation. Typically, walker 10 users have muscle weakness, and many, though not all, are elderly. Currently, when getting up from a seated position, these adults often grab whatever is within their reach to provide assistance in standing. This can be a dangerous process which may lead to falls and injuries. In addition, the inability to freely rise from seated positions limits an older adult's independence. The current invention offers two stable configurations to support users in sit-to-stand and in ambulation. First, the walker device 10 is adjusted to a "kneeling" configuration 200 that provides support handles 40 to help the person rise from a seated position. Second, the walker device 10 can be configured into a 'standing" configuration 210 to function as a walker to assist in ambulation. This device 10 can aid individuals to rise from seated positions in virtually any environment including sofas, beds, soft chairs, and even toilets, which differentiate it from other walking aids available. Additionally, the device 10 has also been designed to be aesthetically different from traditional walkers.

Figure 3:
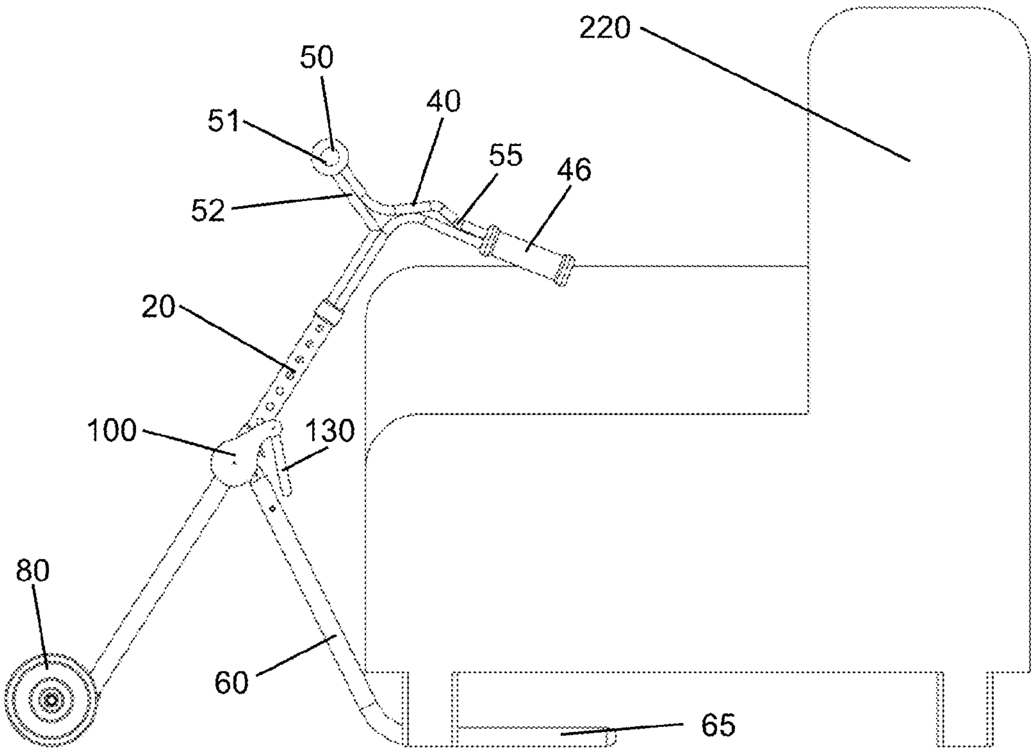
FIG. 3 is a side view of one embodiment of the present invention in a kneeling position in front of a chair.

The concept of the walker device 10 is based upon the need to provide two distinct configurations. A 'standing' configuration 210 (see FIGS. 1, 10, 11, 12, 13 and 14) used during ambulation, and a 'kneeling' configuration 200 (see FIGS. 2, 3, 16 and 17) used when rising from a seated position. In the "kneeling" configuration 210, the walker device's 10 handles are designed to mimic the arm rails on a chair (see FIG. 3) and the rear legs 60 extend under or around the seat. Since not all chairs or sitting surfaces have armrests, the walker device 10 of the instant invention provides assistance wherever the user chooses to sit. In a kneeling configuration 200, the handles 40 provide a point onto which the user can push down to assist in rising from a seated position. The ability to manage this assistive force is due to the rear legs 60 extending under or beside the seat thereby providing the necessary stabilizing torque needed to prevent the walker from tipping toward the user. Current walkers will tip if the user were to pull on them to assist in standing. This design provides safe and stable assistance to permit independence in rising from a seated position.

Looking to the figures wherein like numbers indicate like items, the current invention includes a walker 10 to assist a person rising from a seated position, the walker 10 comprising: two or more front legs 20 each having a proximal end 21, a center 23 and a distal end 25, the distal end being adapted to contact the ground, one or more cross members 30 secured to and joining the front legs 20 to one another, a handle 40 engaged to the proximal end 21 of each the front leg 20, a joint mechanism 100 engaged to each the front leg 20 and a rear leg 60 having a proximal end 61, a center 63 and a distal end 65, with the proximal end 61 being engaged to each joint mechanism 100 allowing the rear legs 60 to pivot relative to the front legs 20. One embodiment of the current invention further comprises a wheel assembly which includes a wheel mounting to 26 engaged to the distal end 25 of a front leg and a wheel 80 rotatably engaged to the wheel mounting 26.

Another embodiment of the current invention includes a walker 10 to assist a person rising from a seated position such as a chair 220, the walker 10 comprising: two or more front legs 20 each comprising a handle mounting tube 22 at a proximal end 21, a center 23 and wheel mounting tube 26 at a distal end 25, a wheel 80 secured to the wheel mounting tube 26, one or more cross members 30 secured to and joining the front legs 20 to one another, a handle 40 engaged to the handle mounting tube 22 of each the front leg 20, a joint mechanism 100 engaged to the center of each the front leg 20, separating the handle mounting tube 22 from the wheel mounting tube 26 and a rear leg 60 having a proximal end 61, a center 63 and a distal end 65, the proximal end 61 being engaged to each joint mechanism 100 allowing the rear legs 60 to pivot relative to the front legs 20.

The front legs 20, cross members 30, handles 40 and rear legs 60 are generally made from a tubular material. The tubular material may be metal, plastic, wood, carbon fiber, or any combination thereof. In one embodiment of the current invention, the walker 10 further includes a wheel assembly 80 secured to the distal ends 25 of each front leg 20. As illustrated in the figures, a front leg 20 may be comprised of a handle mounting tube 22 at its proximal end 21, the handle mounting tube having a proximal end which is engaged to a handle and a distal end which is engaged to an upper housing mount 102. The front leg 20 is further comprised of a wheel mounting tube 26 at its distal end 25, the wheel mounting tube having a proximal end which is engaged to a wheel assembly 80 and a distal end which is engaged to a lower housing mount 104. In another embodiment of the current invention, the handles 40 are telescopically engaged to the front legs 20 and each said handle 40 and front leg 20 further include a height adjustment mechanism 27 which allows the height of the handles to be individually adjusted to a height desired by a user. The adjustment mechanism 27 may include compression clamps, snap stops, spring plungers, threaded rods, or any combination thereof. The front legs 20 may be linear (as illustrated in the figures) or curved.

Looking now to the cross members 30, which are illustrated in FIGS. 1, 2 and 8 through 12, one can see that the cross members secure one front leg 20 to another front leg 20. Each cross member 30 includes a proximal end 31, a center 33 and a distal end 35. The proximal end 31 of a cross member is engaged and secured to a first front leg 20 and the distal end 35 of the cross member is engaged and secured to a second front leg 20. In one embodiment, the cross member 30 may be welded at each end, to secure it to the first and second front legs. In another embodiment, the cross member 30 may engage each front leg further including a coping insert 36 to aid in stabilizing the engagement point. The coping insert 36 may be engaged by a fastener 4 to retain the cross member 30 in its desired position. As illustrated in the figures, a cross member 30 20 may be linear (as illustrated in the figures) or curved.

Figure 8:
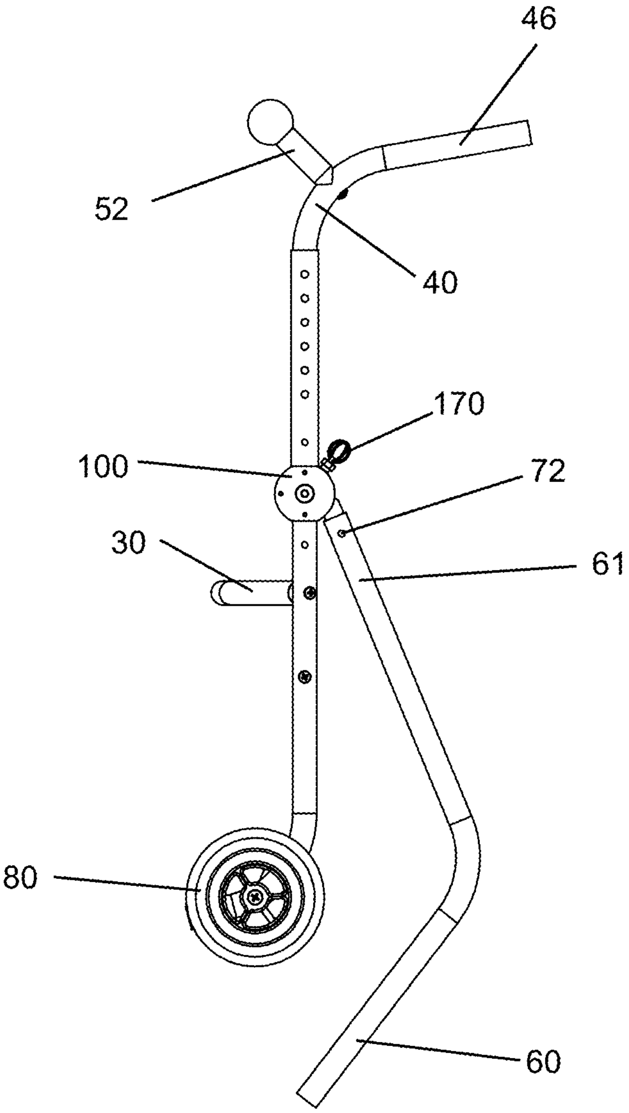
FIG. 8 is a side view of one embodiment of the present invention in a collapsed position.
Figure 9:
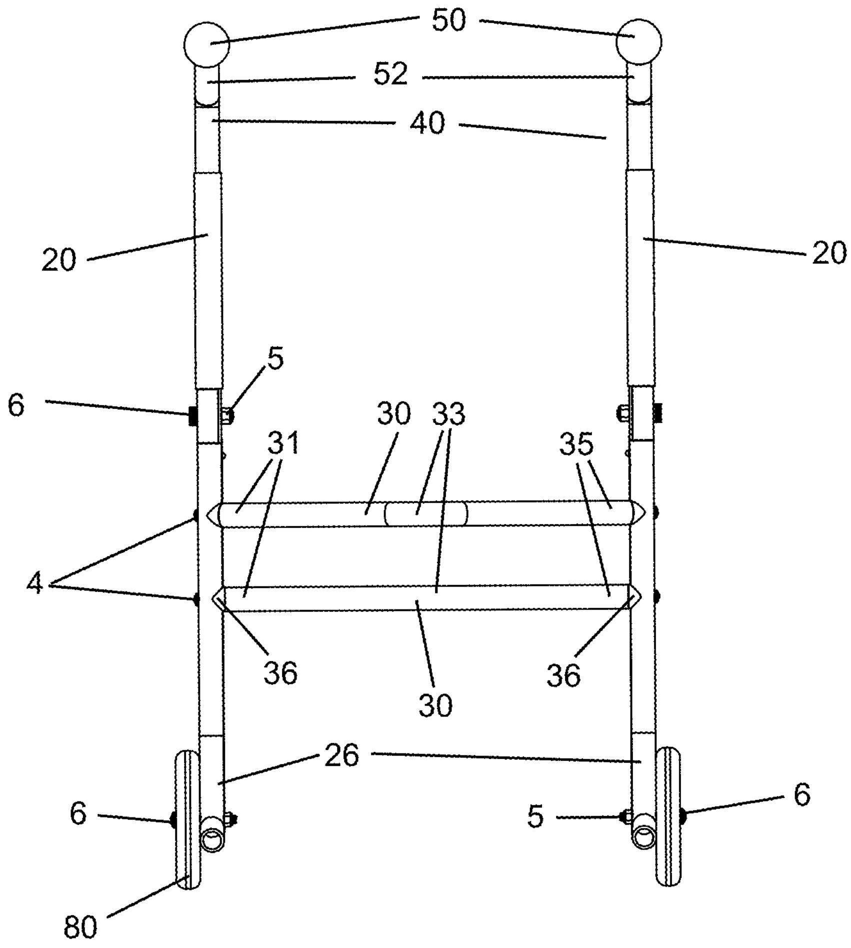
FIG. 9 is a front view of one embodiment of the present invention in an upright position.
Figure 10:
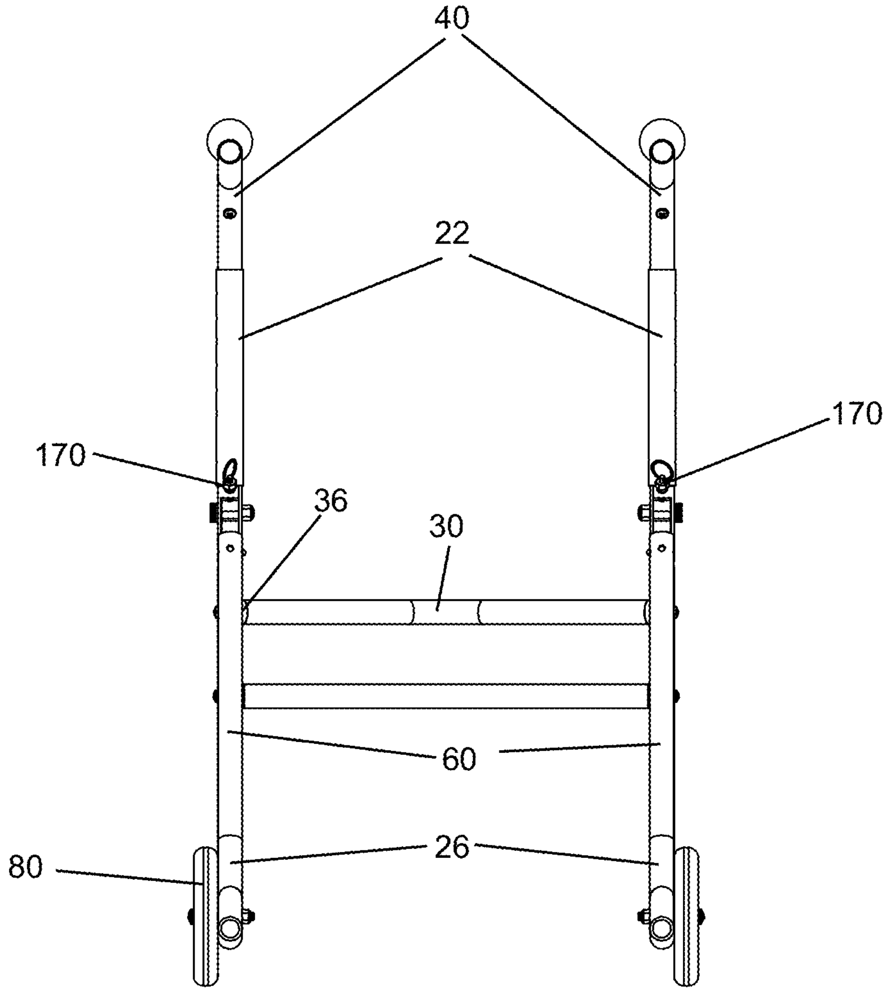
FIG. 10 is a rear view of one embodiment of the present invention in an upright position.
Figure 11:
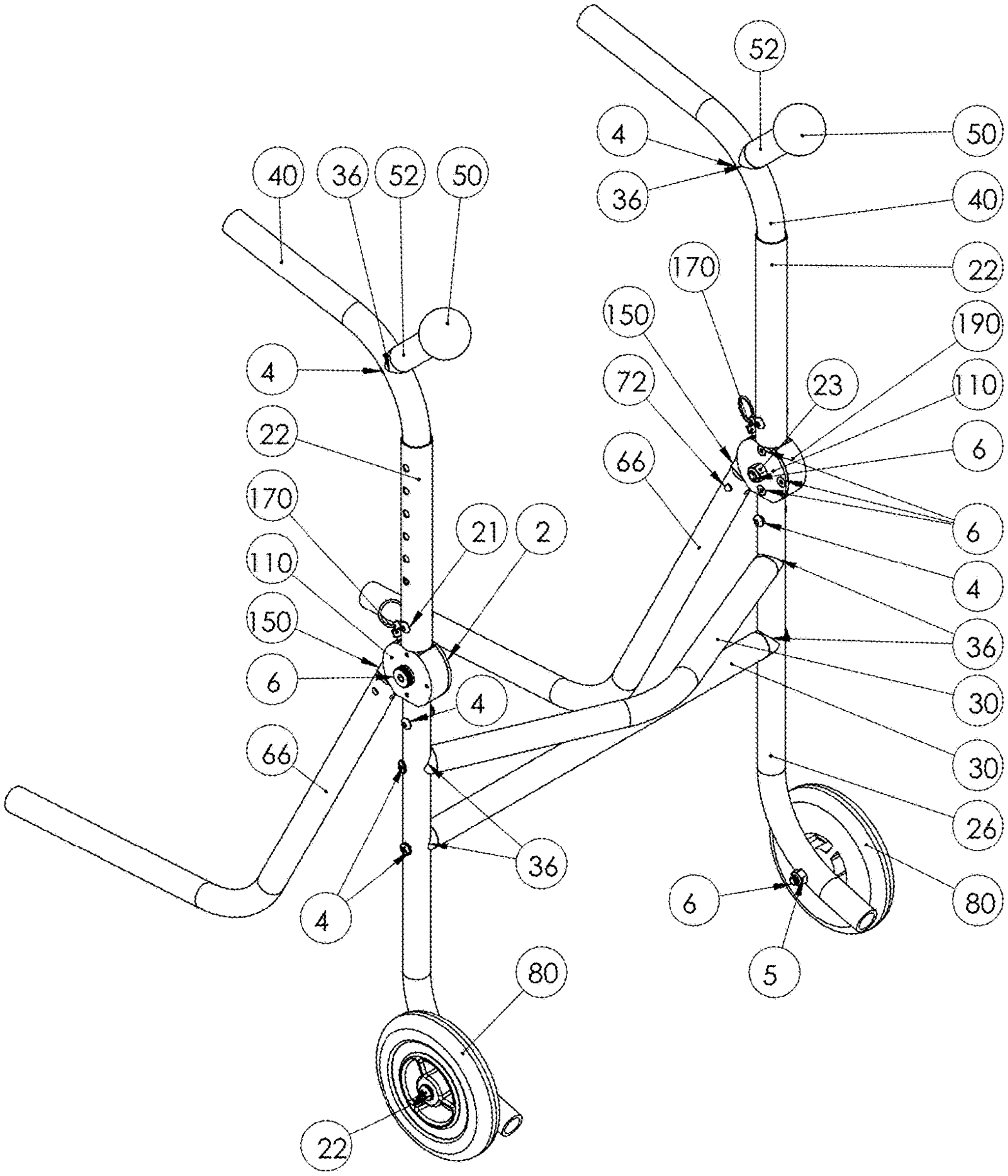
FIG. 11 is a front perspective view of one embodiment of the present invention in an upright position.
Figure 12:
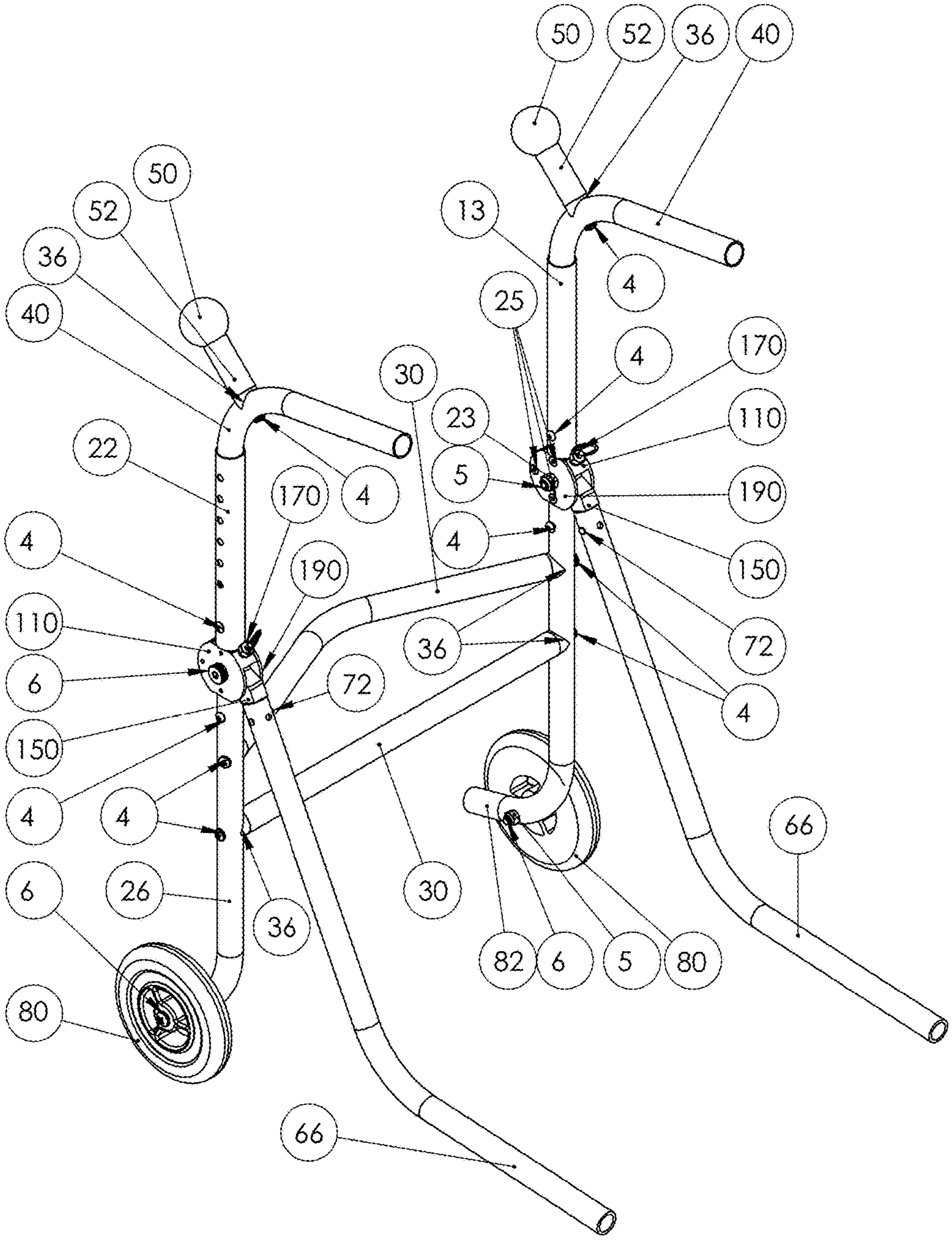
FIG. 12 is a rear perspective view of one embodiment of the present invention in an upright position.
Figure 13:
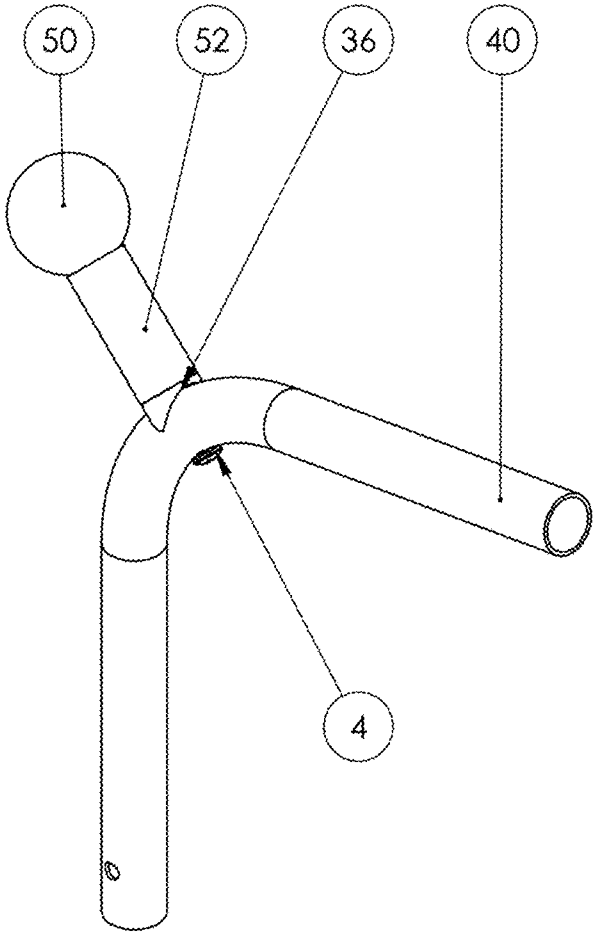
FIG. 13 is a perspective view of one embodiment of a handle of the present invention.
Figures 14A, 14B:
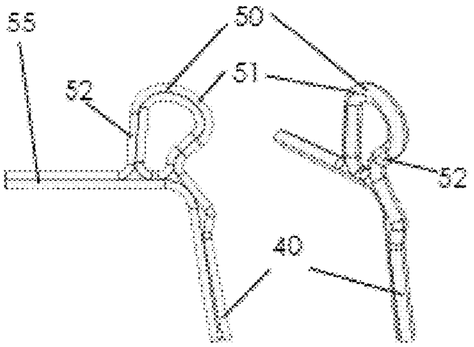
FIG. 14A is a side view of one embodiment of a handle the present invention.
FIG. 14B is a perspective view of one embodiment of a handle the present invention.
Figures 15A, 15B:
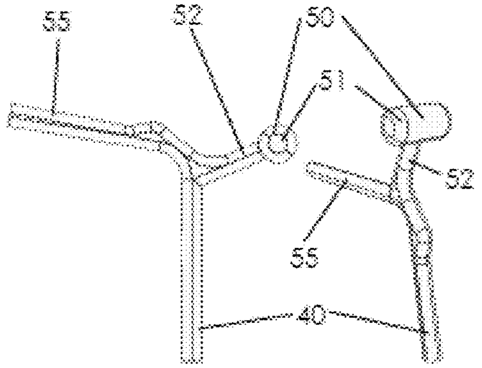
FIG. 15A is a side view of one embodiment of a handle the present invention.
FIG. 15B is a perspective view of one embodiment of a handle the present invention.
Figures 16A, 16B:
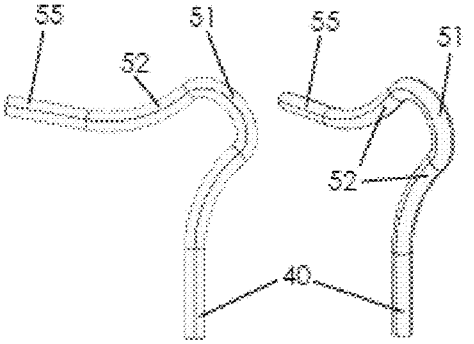
FIG. 16A is a side view of one embodiment of a handle the present invention.
FIG. 16B is a perspective view of one embodiment of a handle the present invention.
Figures 17A, 17B:
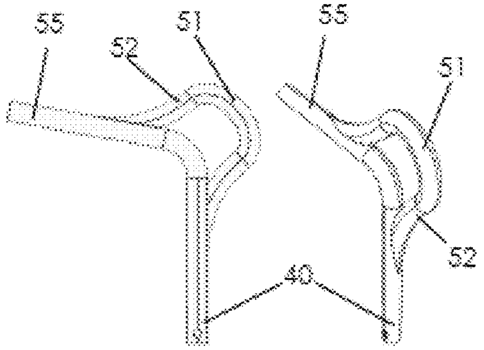
FIG. 17A is a side view of one embodiment of a handle the present invention.
FIG. 17B is a perspective view of one embodiment of a handle the present invention.
Figures 18A, 18B, 18C:
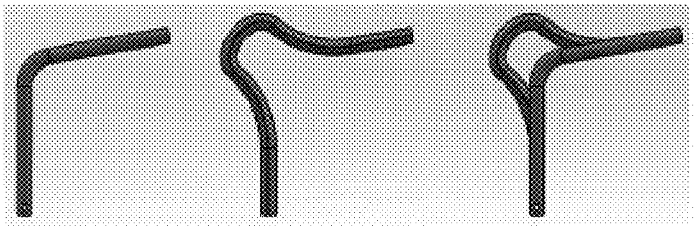
FIG. 18A is a side view of one embodiment of a handle the present invention.
FIG. 18B is a side view of one embodiment of a handle the present invention.
FIG. 18C is a side view of one embodiment of a handle the present invention.
Figures 18D, 18E:
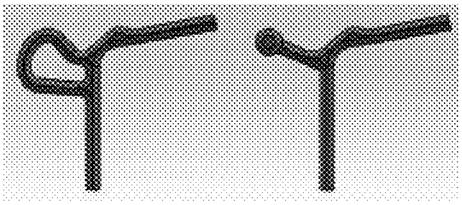
FIG. 18D is a side view of one embodiment of a handle the present invention.
FIG. 18E is a side view of one embodiment of a handle the present invention.
Figure 19A:
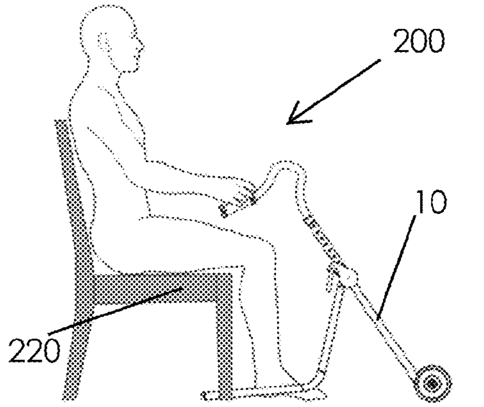
FIG. 19A is a side view of one embodiment of the present invention in use.
Figure 19B:
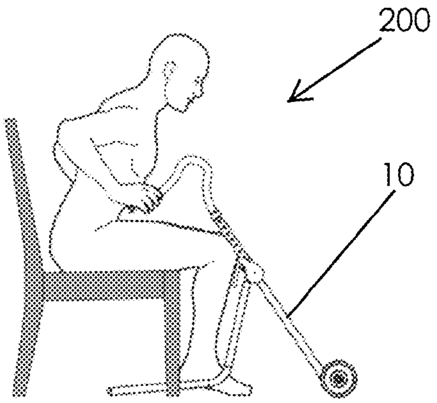
FIG. 19B is a side view of one embodiment of the present invention in use.
Figure 19C:
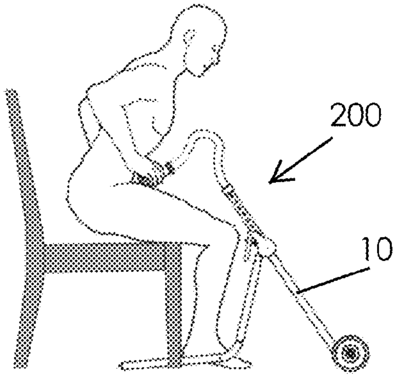
FIG. 19C is a side view of one embodiment of the present invention in use.
Figure 19D:
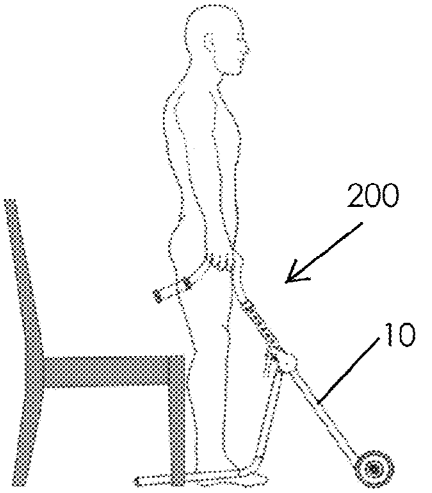
FIG. 19D is a side view of one embodiment of the present invention in use.
Figure 19E:
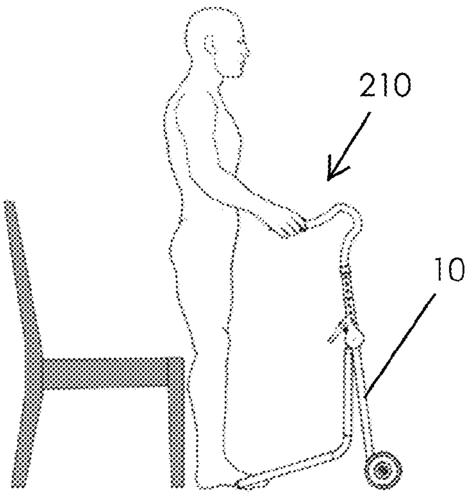
FIG. 19E is a side view of one embodiment of the present invention in use.
Figure 20A:
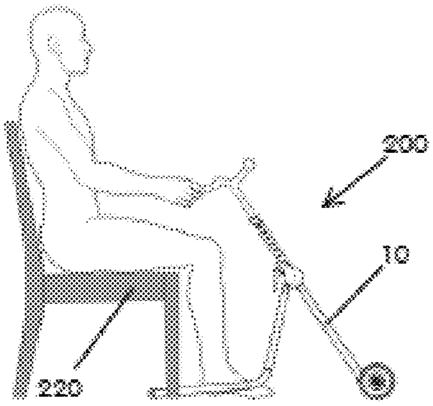
FIG. 20A is a side view of one embodiment of the present invention in use.
Figure 20B:
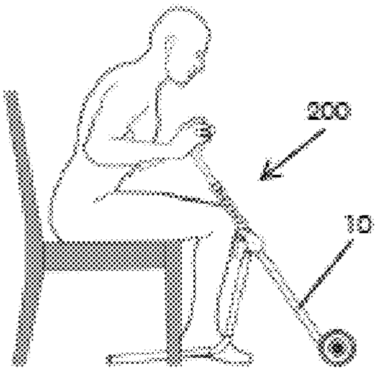
FIG. 20B is a side view of one embodiment of the present invention in use.
Figure 20C:
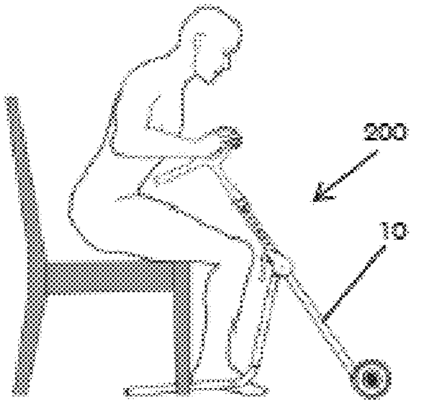
FIG. 20C is a side view of one embodiment of the present invention in use.
Figure 20D:
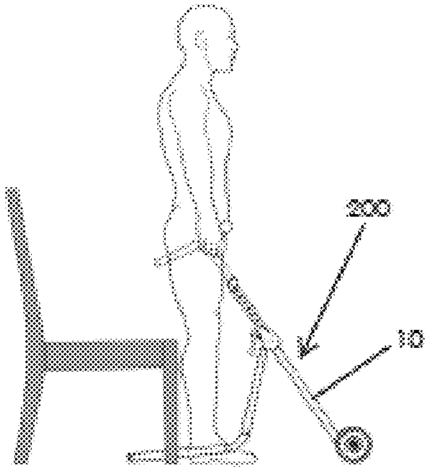
FIG. 20D is a side view of one embodiment of the present invention in use.
Figure 20E:
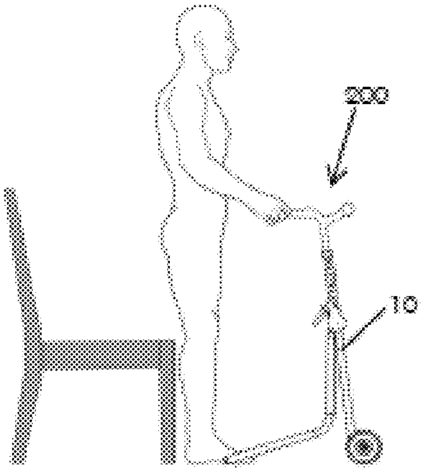
FIG. 20E is a side view of one embodiment of the present invention in use.

Looking now to the rear legs 60, one can see that each rear leg is engaged to the joint mechanism 100 which allows the rear leg to pivot relative to the front leg 20. Each rear leg 60 includes a proximal end 61, a center 63 and a distal end 65. Each rear leg 60 is engaged at its proximal end 61 to the joint mechanism 100. The distal end 65 of the rear leg may be referred to as the rear support tube 66, which includes an upper surface 67 and a lower surface 68. The lower surface 68 is designed to engage the ground while the walker 10 is in either the kneeling configuration 200 or the standing configuration 210. The rear legs 60 may also include a locking mechanism 72, which, when disengaged, allows for each rear leg 60 to be rotated to configure the walker 10 into a more compact form (FIG. 8). The locking mechanism 72 may include compression clamps, snap stops, spring plungers, threaded rods, or any combination thereof. In another embodiment of the current invention, a rear leg 60 further includes a height adjustment mechanism (not illustrated) similar to the mechanism described previously which allows the length/height of the rear legs to be individually adjusted to a height desired by a user. The height adjustment mechanism may operate in a telescopic manner and which includes compression clamps, snap stops, spring plungers, threaded rods, or any combination thereof to lock the mechanism at a desired height/length. The rear legs 60 are curved as illustrated in the figures. In one embodiment of the instant invention, the distal end 65 of the rear legs may be flattened, in a shape similar to a ski.

Looking now to the handle 40, one can see that each handle is secured to the proximal end 21 of a front leg 20. Each handle 40 includes a proximal end 41, a center 43 and a distal end 45. A grip 46 may be located on the distal end 45. In one embodiment current invention, a handle 40 may further comprise a primary projection 55 emanating in the same general direction as the rear legs 60. The primary projection 55 serves as a primary handle 56. The handle 40 further comprises a secondary projection 52 emanating at an upward angle from the primary projection 55 and a secondary handle 50 is secured to the end of the secondary projection. The secondary handle 50 may further include a grip 51. Each grip 46, 51 may include any grip known in the art which aids a person in maintaining their hold on the device/handle. Looking to FIGS. 13 through 17, numerous embodiments and configurations for the handles 40 are illustrated. In one embodiment, a handle 40, its primary projection 55 and secondary projection 52 and secondary handle 50 are welded to them in place. In another embodiment, a coping insert 36 is used to aid in stabilizing the engagement points. The coping insert 36 may be engaged by a fastener 4 to retain the each component in its desired position.

Figure 21:
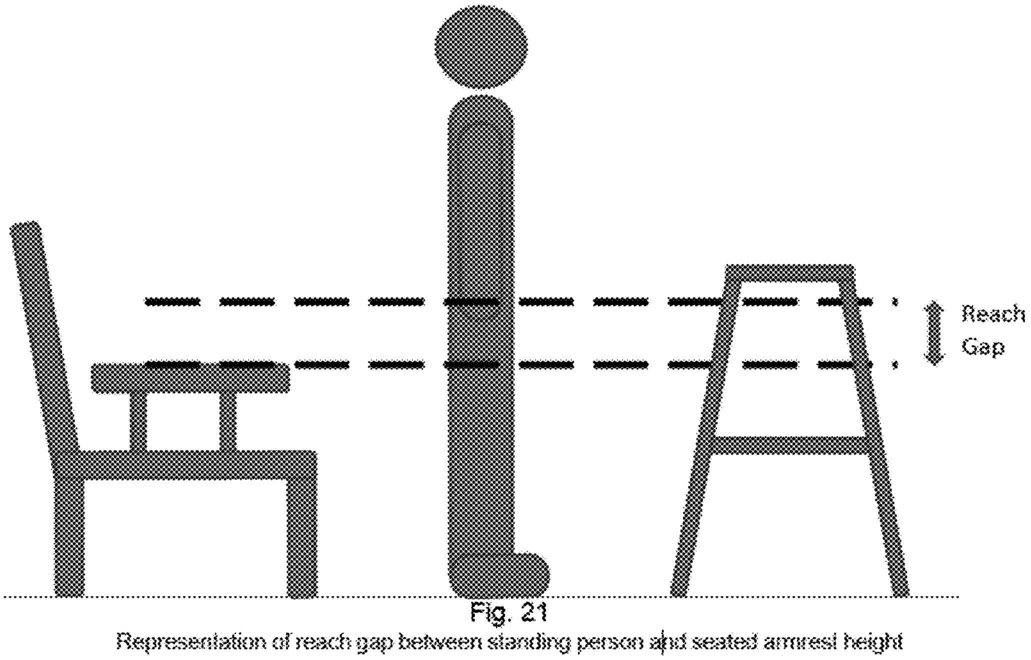
FIG. 21 is a side view of an illustration of a prior art walker.

Several design features of the current invention are based upon human factors and usability evaluation. These include, the heights of the walking/standing 210 and kneeling configurations 200, handle design, latch operation, smooth ambulation, and folding for storage. The height of the walker 10 is designed based upon human anthropometrics so that the handle 40 height corresponds with the proper walker height for the 5th to the 95th percentile of users. The handles 40 are designed to be easily adjusted in height over a range of about 6 inches. One embodiment employs detents that are commonly used with existing walkers. Furthermore, the geometry of the device is designed such that when the handle height meets user needs when in its standing 210 and kneeling 200 configurations. Another key design feature addresses the fact that the optimal height of the handle 40 for pushing off while rising from a seat cannot be reached from a standing position without bending over or stopping (see FIG. 21). Thus, users with muscle weakness or instability may have difficulty in reaching down to lift the device to its standing configuration after rising from a seat. To accommodate this need, the handles have been designed for use in both device configurations (see FIGS. 18A-E). The handles 40 have a novel two section design to permit proper access while standing and walking. In some embodiments, the handles 40 incorporate a rearward loop or protrusion to meet both functional needs. A user can push off of one portion of the handle (i.e., the secondary projection 52, the secondary handle 50) when the device is in the kneeling configuration 200 and grasp the 2nd portion of the handle (i.e., the primary projection 55, the primary handle 56) once they are standing. Some of these handle designs can be adjusted to further optimize their fit to the user. Furthermore, these handles are designed to permit users to grasp them in multiple ways, allowing the user to select the grip that is most comfortable and functional.

Figure 4:
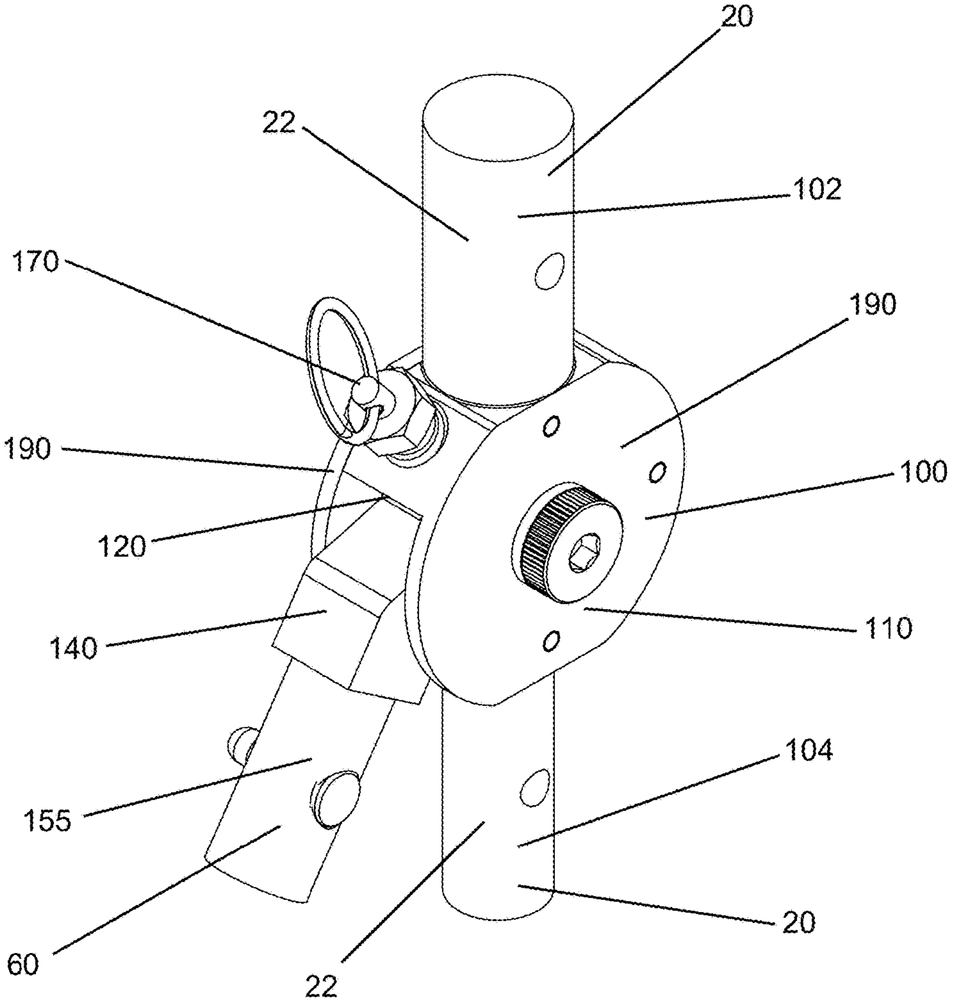
FIG. 4 is a proximal view of one embodiment of a joint mechanism of the present invention.
Figure 5:
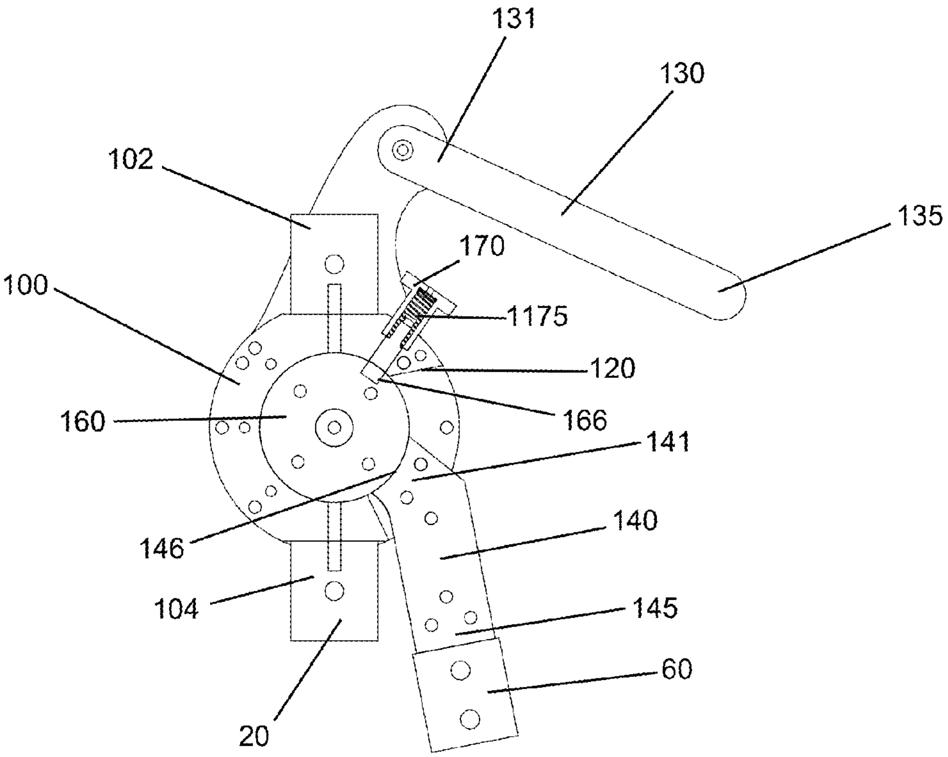
FIG. 5 is a side view of one embodiment of a joint mechanism of the present invention.
Figure 6:
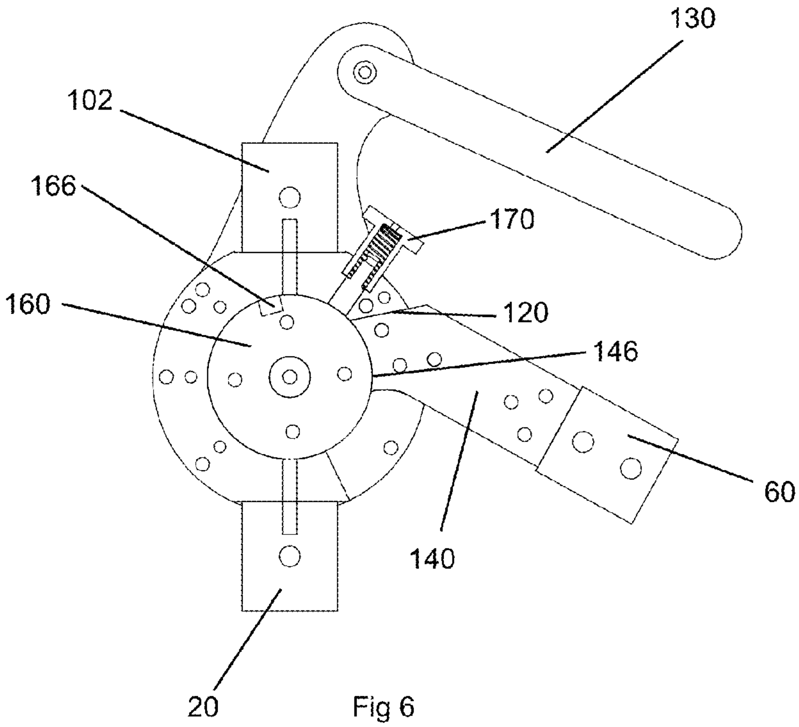
FIG. 6 is a side view of one embodiment of a joint mechanism of the present invention.

The current invention features a novel joint mechanism 100 which differs from prior art. This mechanism allows the device to safely transition between two stable load bearing positions that match the walking/standing 210 and kneeling 200 configurations. The joint mechanism 100 has a slim profile that extends less than ½ inch on either side of the legs, and incorporates an in-line design that aligns the front legs 20 and back legs 60 directly behind one another as opposed to side by side as described in the prior art. A rigid shelf 120, which is a feature of the joint housing, serves as a hard stop that prevents the rear leg, 60 from rotating beyond the designed angle for the kneeling configuration, 200 (see FIGS. 4-6). This consideration affords a more robust and safe joint design. The actuation mechanism 130 of the joint retracts (see FIG. 8) a pin 172 from a socket 166 located in the joint mechanism's solid inner bearing 160 and allows the rear leg, 60 freedom to rotate back, lowering the device into the kneeling configuration 200 (see FIG. 6). The device can be returned to the standing configuration 210 by simply lifting up on the handles 40 (see FIG. 5). The rear leg, 60 will rotate forward until the pin 172 realigns with the socket 166 and clicks back into place by a compressed spring 175. This results in a simple and relatively effortless interface in which the user can raise and lower the walker device 10 into its two operating configurations. Mechanisms disclosed previously, although feasible, were determined to be overly complex and unnecessary to achieve the design goals of the device. In contrast, the current pin 172 and socket 166 design embodies a simplicity that offers increased robustness, lower cost, half the total weight, and ease of production. The new socket 166 and pin 172 mechanism has incorporated design for manufacturing principles and can be manufactured out of dowel pins and plate stock steel and aluminum. The current joint mechanism 100 also includes features that enable the walker device's legs 20, 60 to be attached without the need for welding.

One embodiment of the instant invention discloses a walker with a joint mechanism that is comprised of a bearing 160 which includes a socket 166, a tongue end fitting 140 engaged with the bearing 160, one or more clevis type connector 125 secured to the bearing 160 and the tongue end fitting 140, a housing 110 surrounding the bearing 160, the tongue end fitting 140 and the clevis type connectors 125 wherein the bearing 160 may pivotally rotate within the housing 110 in a center cavity 119 and the tongue end fitting 140 extends out of the housing through a pipe insert aperture 115, the rear leg, 60 is engaged to the tongue end fitting 140, a support release pin assembly 170 secured to the housing 110 and operationally associated with the socket 166 and a trigger lever 130 operationally associated with the support release pin assembly 170 which, when actuated, withdraws the pin 172 from the socket, allowing the support release pin assembly to secure the bearing 160 and the rear legs 60 in a standing configuration 210 or to release the bearing 160 and allow the bearing 160 and the rear legs 60 in a kneeling configuration 200. In one embodiment of the instant invention, the bearing is a roller bearing.

Figure 7:
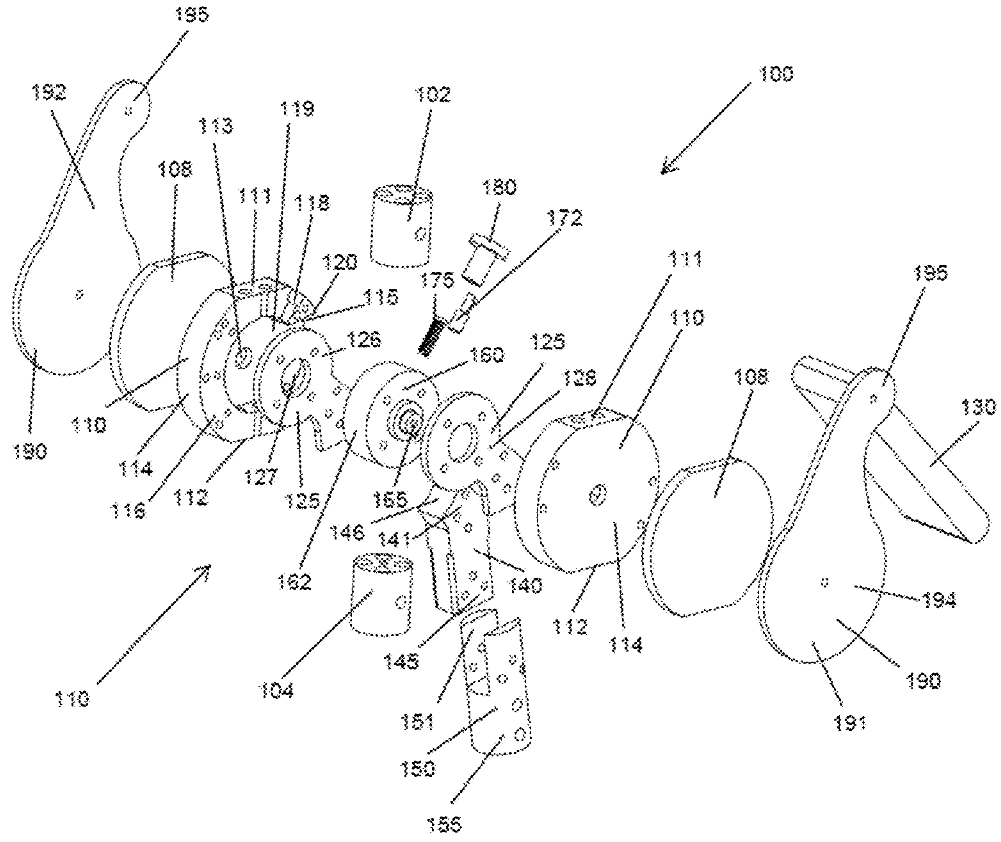
FIG. 7 is an exploded view of one embodiment of a joint mechanism of the present invention.

FIG. 7 illustrates one embodiment of a joint mechanism 100 of the instant invention wherein the housing 110 includes an upper end 111, a lower end 112, an inner aperture 113, a center cavity 119 and an outer surface 114. The housing also includes a perimeter ring 116, a pipe insert aperture 115, a pin aperture 118 and a hard stop shelf 120. The center cavity 119 surrounds and protects the bearing 160 which is secured in place by a pair of clevis type connectors 125. Each clevis type connector 125 is engaged with the bearing 160 on its inner surface 126 and is engaged to the housing 110 on its outer surface 128. The clevis type connector 125 also has an aperture 127 through which a fastener 4 may travel. FIG. 7 also illustrates a tongue end fitting 140 with a proximal end 141 and a distal end 145 and a bearing engagement surface 146 located on its proximal end 141. The tongue end fitting 140 engages the outer perimeter surface 162 of the bearing 160 with its bearing engagement surface 146. The clevis type connectors 125 engage both the bearing 160 and the tongue end fitting 140 and secure them together. The distal end 145 of the tongue end fitting 140 engages the proximal end 151 a pipe insert base 150. The distal end 155 of the pipe insert base 150 is engaged with the proximal end 61 of a rear legs 60. A housing spacer 108 is engaged with the outer surface 114 of each side of the housing 110 and a side panel 190 is engaged to each of the housing spacers 108. The side panel includes a body 191 which engages the housing spacer 108, an inner surface 192 which engages the housing spacer 108, an outer surface 194, and an arm of 195 which is engaged to the trigger lever 130 and secures it in place. The trigger lever 130 is rotationally engaged to the arm 195 of the side panel at its proximal end 131, and may be manipulated at its distal end 135.

The support release pin assembly 170 includes a pin 172, a spring 175 and a pin screw 180. The pin screw 180 is engaged with the pin 172 and the spring 175 is sandwiched between the pin screw 180 and the pin 172 with the spring being biased to push the pin 172 away from the pin screw 180 and push the pin 172 into the socket 166 on the bearing 160. The pin 172 is slidably engaged with the pin aperture 118 and engages with the socket 166 to retain the bearing 160 in the standing configuration 210. The support release pin assembly 170 is operationally associated with the trigger lever 130.

Trigger levers 130 are used to allow the walker device 10 to transition from a standing/walking configuration 210 to a kneeling configuration 200. The trigger lever 130 has been designed to be operated via gross motions that don't require precision grip or fine motor dexterity. The user simply lifts up on the trigger lever 130 which will retract the pin 172 from the socket 166 allowing the walker 10 to transition to the kneeling configuration 200. The trigger lever is operationally associated with the pin 172 of the pin release assembly by any means known in the art which include, but are not limited to, cables, wires, chains, rods, coils, or a combination thereof. Furthermore, the joint mechanism 100 is designed with special consideration so that it is difficult to accidentally trigger the mechanism because the lever 130 must be lifted instead of pressed down. If, for example, pressing down on the lever actuated the trigger and the user accidentally bumped the lever down or an object falls and hits the lever, the device 10 could suddenly fall to its kneeling position. This would be particularly dangerous if the user were bearing their weight on the device at the time. For storage or transport, the device's rear legs 60 can swivel or rotate to approximate the forward frame into a more compact configuration (see FIG. 8). In addition to these safety and user considerations, wheels 80 may be attached in front of the device 10 to make it easy to push, as well as rigid, low friction sliders that can be attached to the lower surface 68 of the rear legs in order to prevent unwanted scrapes to floor surfaces.

The current invention also includes a method of using a walker 10 to assist a person rising from a seated position comprising the steps of:

a. providing a person in a seated position;

b. providing a walker 10 comprising: two or more front legs 20 each having a proximal end 21, a center 23 and a distal end 25, the distal end being adapted to contact the ground, one or more cross members 30 secured to and joining the front legs 20 to one another, a handle 40 engaged to the proximal end 21 of each the front leg wherein the handle 40 is comprised of two projections that serve as primary 56 and secondary 52 handles or hand grips, a joint mechanism 100 engaged to each front leg 20, wherein the joint mechanism 100 is comprised of: a bearing 160 which includes a socket 166, a tongue end fitting 140 engaged with the bearing 160, one or more clevis type connectors 125 secured to the bearing and the tongue end fitting, a housing 110 surrounding the bearing 160, the tongue end fitting 140 and the clevis type connectors 125 wherein the bearing 160 may pivotally rotate within the housing 110 and the tongue end fitting 140 extends out of the housing 110, a rear leg, 60 is engaged to the tongue end fitting 140, a support release pin assembly 170 secured to the housing 110 and operationally associated with the socket 166 and a trigger lever 130 operationally associated with the support release pin assembly 170 which, when actuated, withdraws the pin 172 from the socket 166, allowing the support release pin assembly to secure the roller bearing 160 and the rear legs 60 in a standing configuration 210 or to release the bearing and allow the roller bearing and the rear legs in a kneeling configuration 200, the rear leg, 60 having a proximal end 61 and a distal end 65, the proximal end being engaged to tongue end fitting 140 allowing the rear legs to pivot relative to the front legs 20;

c. sliding the walker 10, in the standing configuration 210, toward the person into a position which allows the person to grab the handles 40 and the trigger lever 130;

d. actuating the trigger lever 130 to withdraw the pin 172 from the socket 166;

e. moving the walker 10 from the standing configuration 210 to the kneeling configuration 200 rotating the bearing 160 and the rear legs 60 away from the front legs 20 and in the direction of the person sitting;

f. grabbing either the primary 55 or secondary 52 handle;

g. exerting force on the handle 55, 52 with the rear legs 60 providing stability and a fulcrum to assist the person moves from a sitting position to a standing position;

h. lifting the handles 55, 52 and the walker 10 up high enough for the rear legs to rotate back toward the front legs 20;

i. engaging the pin 172 with the socket 166; and j. standing or walking forward with the aid of the walker 10.

The above step (i) occurs automatically due to the spring biased pin 172 forcing itself into the socket 166 as the bearing and legs rotate back to the standing position 210.

Any method described herein may incorporate any design element contained within this application and any other document/application incorporated by reference herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

The present invention may be embodied in other forms without departing from the spirit and the essential attributes thereof, and, accordingly, reference should be made to the appended claims, rather than to the foregoing specification, as indicating the scope of the invention. The invention illustratively discloses herein suitably may be practiced in the absence of any element which is not specifically disclosed herein.

We claim:

1. A walker to assist a person rising from a seated position, said walker comprising:

two front legs each having a proximal end, a center and a distal end;

one or more cross members secured to and joining said front legs to one another;

a handle engaged to the proximal end of each front leg;

a joint mechanism engaged to each front leg; and two rear legs having a proximal end and a distal end, said proximal end being engaged to each joint mechanism allowing said rear legs to pivot relative to said front legs;

wherein said joint mechanism is comprised of:

a bearing which includes a socket;

a tongue end fitting engaged with said bearing;

one or more clevis type connectors secured to said bearing and said tongue end fitting;

a housing surrounding said bearing, said tongue end fitting and said clevis type connectors, wherein said bearing pivotally rotates within said housing and said tongue end fitting extends out of said housing;

said rear leg is engaged to said tongue end fitting;

a support release pin assembly secured to said housing and operating with said socket; and a trigger lever operating with said support release pin which, when actuated, withdraws said pin from said socket, allowing said support release pin assembly to secure said bearing and said rear legs in a standing configuration or to release said bearing and allow said bearing and said rear legs to be secured in a kneeling configuration.

2. The walker of claim 1 further comprising a wheel assembly secured to the distal ends of each front leg.

3. The walker of claim 1 wherein the handles are telescopically engaged to the front legs and each handle and front leg further include a height adjustment mechanism which allow the height of the handles to be individually adjusted to a height desired by a user.

4. The walker of claim 1 wherein said rear legs each further include a locking mechanism which, when disengaged, allows for each rear leg to be rotated to configure the walker into a more compact form.

5. The walker of claim 1 wherein said handle further comprises:

a primary projection extending in the same general direction as said rear legs that serves as a primary handle;

a secondary projection extending at an upward angle from the primary projection that serves as a secondary handle; and a grip secured to said secondary projection.

6. A walker to assist a person rising from a seated position, said walker comprising:

two front legs each comprising a proximal end, a center and a distal end, wherein each front leg comprises a handle mounting tube at a proximal end, and wheel mounting tube at a distal end;

a wheel secured to said wheel mounting tube;

one or more cross members secured to and joining the front legs to one another;

a handle engaged to said handle mounting tube of each front leg;

a joint mechanism engaged to the center of each front leg, separating said handle mounting tube from said wheel mounting tube; and two rear legs having a proximal end and a distal end, said proximal end being engaged to each joint mechanism allowing said rear legs to pivot relative to said front legs;

wherein the joint mechanism is comprised of:

a bearing which includes a socket;

a tongue end fitting engaged with said bearing;

one or more clevis type connectors secured to said bearing and said tongue end fitting;

a housing surrounding said bearing, said tongue end fitting and said clevis type connectors, wherein said bearing pivotally rotates within said housing and said tongue end fitting extends out of said housing;

said rear leg is engaged to said tongue end fitting;

a support release pin assembly secured to said housing and operating with said socket; and a trigger lever operating with said support release pin which, when actuated, withdraws said pin from said socket, allowing said support release pin assembly to secure said bearing and said rear legs in a standing configuration or to release said bearing and allow said bearing and said rear legs to be secured in a kneeling configuration.

7. The walker of claim 6 wherein the handles are telescopically engaged to the handle mounting tube and each handle and handle mounting tube further include a height adjustment mechanism which allow the height of the handles to be individually adjusted to a height desired by a user.

8. The walker of claim 6 wherein said rear legs further each include a locking mechanism which, when disengaged, allows for each rear leg to be rotated to configure the walker into a more compact form.

9. The walker of claim 6 wherein said handle further comprises:

a primary projection extending in the same general direction as said rear legs that serves as a primary handle;

a secondary projection extending at an upward angle from said primary projection that serves as a secondary handle; and a grip secured to said secondary projection.

* * * * *